Nov. 25, 1947.  W. E. PHILLIPS  2,431,501
FREQUENCY CONTROL SYSTEM
Filed Dec. 21, 1944  4 Sheets-Sheet 1

INVENTOR.
WILLIAM E. PHILLIPS
BY
Virgil E. Woodcock
ATTORNEY

Nov. 25, 1947.  W. E. PHILLIPS  2,431,501
FREQUENCY CONTROL SYSTEM
Filed Dec. 21, 1944  4 Sheets-Sheet 2

INVENTOR.
WILLIAM E. PHILLIPS
BY
Virgil E. Woodcock
ATTORNEY

Nov. 25, 1947.  W. E. PHILLIPS  2,431,501
FREQUENCY CONTROL SYSTEM
Filed Dec. 21, 1944  4 Sheets-Sheet 3

INVENTOR.
WILLIAM E. PHILLIPS
BY
Virgil E. Woodcock
ATTORNEY

INVENTOR.
WILLIAM E. PHILLIPS
BY
Virgil E. Woodcock
ATTORNEY

Patented Nov. 25, 1947

2,431,501

UNITED STATES PATENT OFFICE 2,431,501

FREQUENCY CONTROL SYSTEM

William E. Phillips, Drexel Hill, Pa., assignor to Leeds and Northrup Company, Philadelphia, Pa., a corporation of Pennsylvania Application December 21, 1944, Serial No. 569,219

10 Claims. (Cl. 322—32)

This invention relates to control systems, more particularly to a method and means for controlling and maintaining constant an operating characteristic of a dynamo-electric machine and has for an object the provision of a control system which is highly effective to maintain constant said operating characteristic.

This invention, in one form thereof, relates to systems of the general type disclosed in Wunsch Patent No. 1,751,539. In accordance with the systems of said Wunsch patent, a frequency-responsive bridge is provided for determination of frequency variations. A galvanometer deflects in sense and to extent dependent upon the direction and extent of variation of the frequency. The galvanometer in turn controls a mechanical relay which is utilized to adjust the speed of a prime mover or otherwise to maintain at a predetermined value the frequency of the alternating current generator. While the frequency and speed control systems of the said Wunsch patent have been satisfactory, such systems leave something to be desired with respect to the speed of response and with respect to the frequency variations which may occur before the corrective actions have been completed.

In carrying out the present invention, means are provided for obtaining, in response to deviations in the magnitude of a condition, two corrections, one of which is a high speed correction having a high initial value and which decreases relatively rapidly; and the second of which is a slower correction which so changes a control means as to compensate or to correct for the condition which gives rise to the deviation in the condition from a predetermined value. More specifically, an amplified direct current is produced whose polarity and magnitude are dependent upon the sense and extent of the change in the magnitude of the condition. This direct current is utilized to produce a rapid and transient correction in the magnitude of the condition while there is simultaneously produced an adjustment in a control circuit for a more or less permanent change in a control means which regulates the magnitude of said condition.

In the preferred form of the invention, and as applied to a frequency control system, the frequency unbalance from an impedance bridge is greatly amplified and is applied to a pair of electric valves arranged to modify the flow of current through one or more gas tubes. These gas tubes, which may be of the Thyratron type, are utilized to supply the excitation to the motor driving the alternating current generator. The flow of current through the Thyratron tubes is also under the control of a phase-shifting network. Whenever deviation in frequency occurs, the electric valves produce an immediate change in the bias of the Thyratron tubes, thereby to change the current flow therethrough; and there is also produced a semi-permanent change in the phase-shifting network further to modify the magnitude of current flow through the Thyratron tubes and through the motor field winding.

By utilizing the foregoing combinative corrective efforts, a very high degree of accuracy is obtained in the control of the frequency of the alternating current generator.

For a more complete understanding of the invention and for further objects, advantages, and applications thereof, reference should now be had to the accompanying description taken in conjunction with the drawings, in which:

Fig. 1 diagrammatically illustrates a system embodying the invention;

Figure 1:
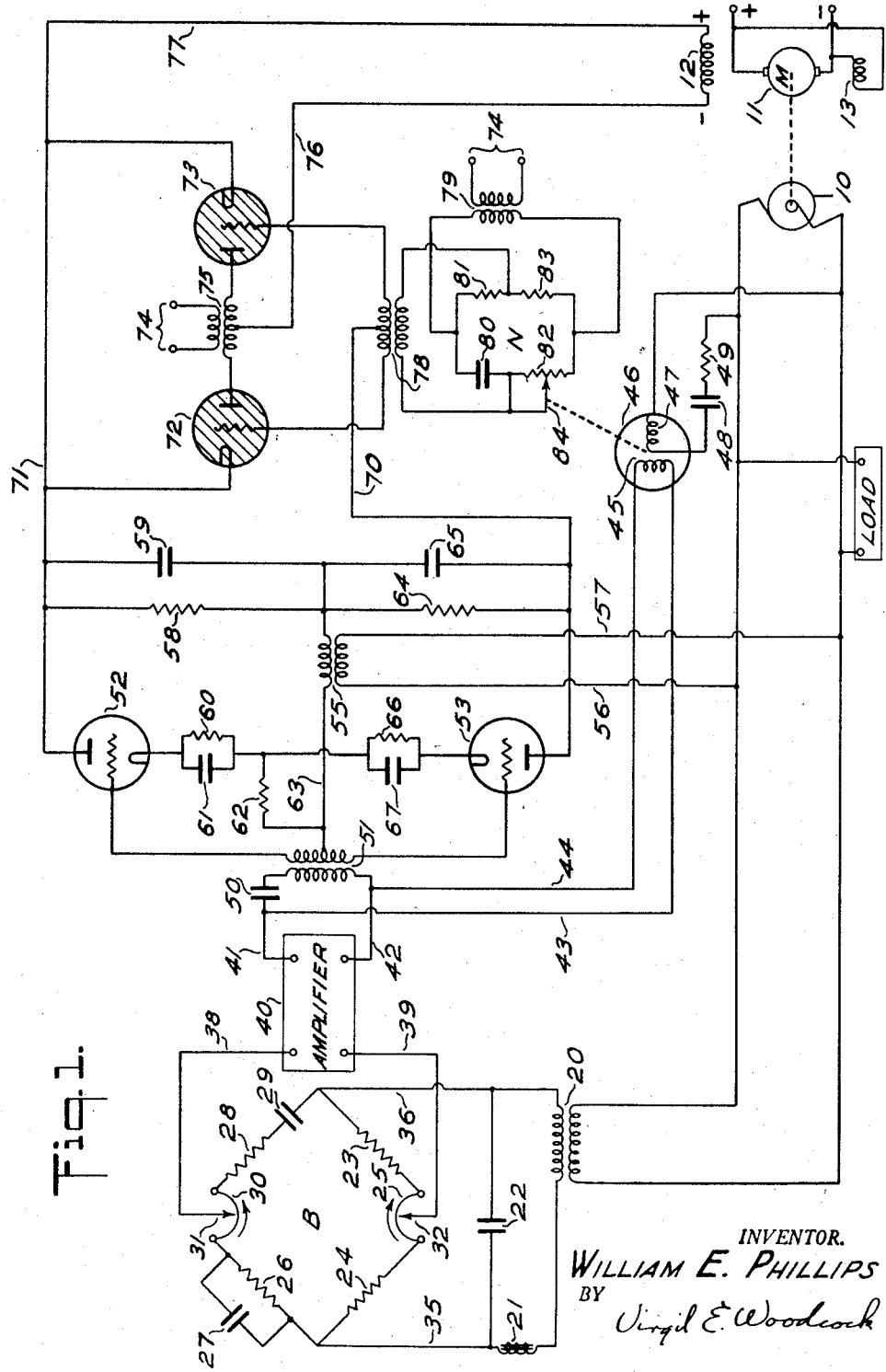
Figure 5:
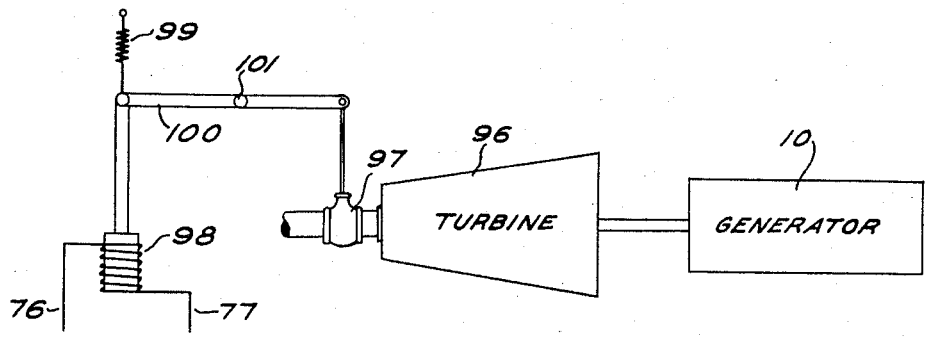
Figure 6:
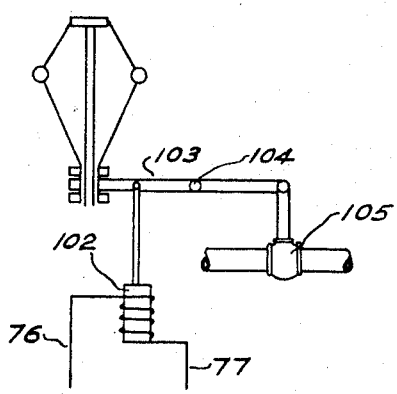
Figure 7:
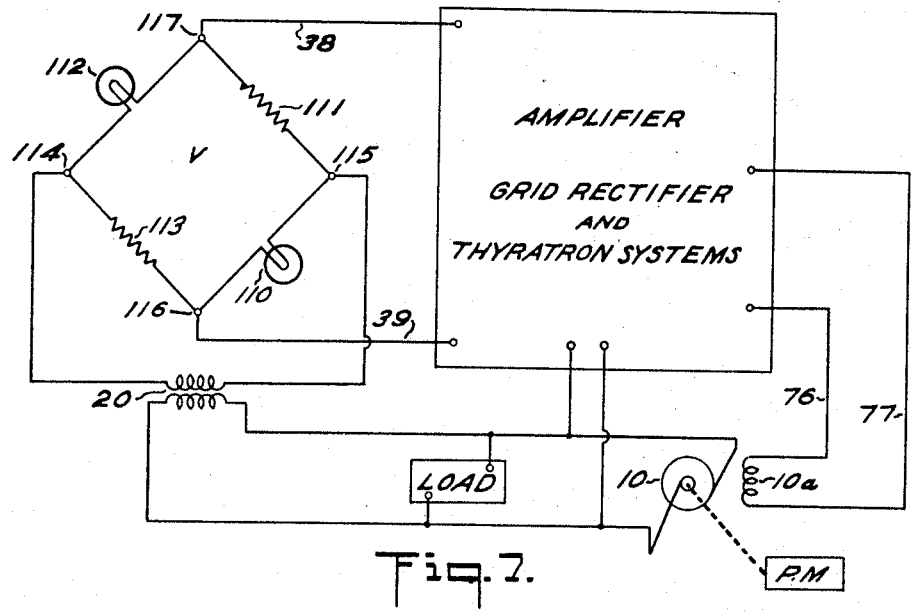
Figure 8:
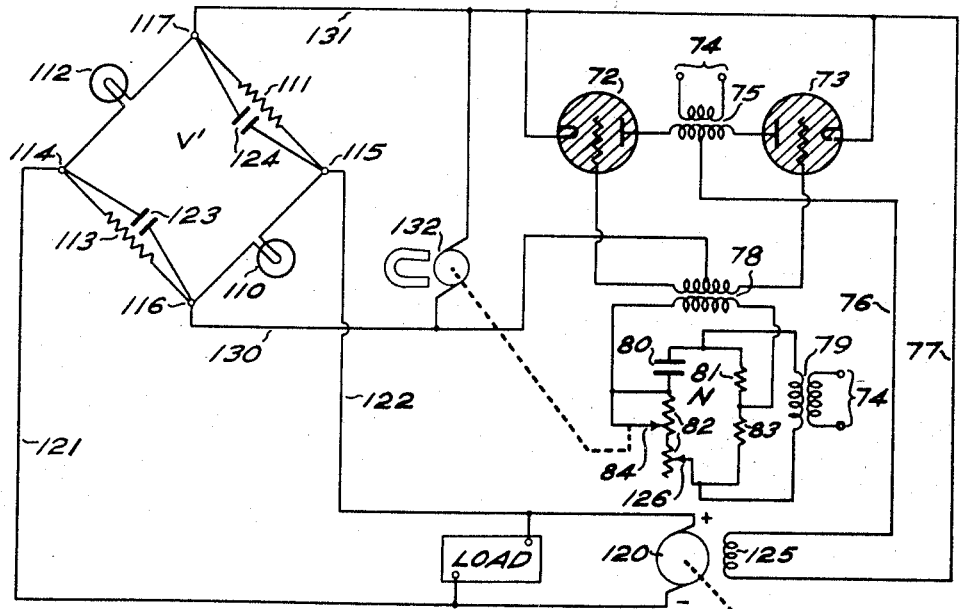

Figs. 5 and 6 diagrammatically illustrate further applications of the invention; and Figs. 7 and 8 illustrate further modifications of the system of Fig. 1.

Referring to the drawings, the invention in one form has been shown as applied to the control of the frequency of a generator 10 driven by a motor 11, having two field windings 12 and 13. The winding 13 is excited from the same source as the armature. The winding 12 is energized to oppose or to act differentially with respect to the excitation of winding 13. The generator 10 is connected to supply alternating current to any desired load as indicated by the rectangle labeled "Load." Though the invention is not limited thereto, it is particularly useful in connection with motor generator sets because of the difficulty of operating such sets to produce alternating current of constant frequency.

Figure 2:
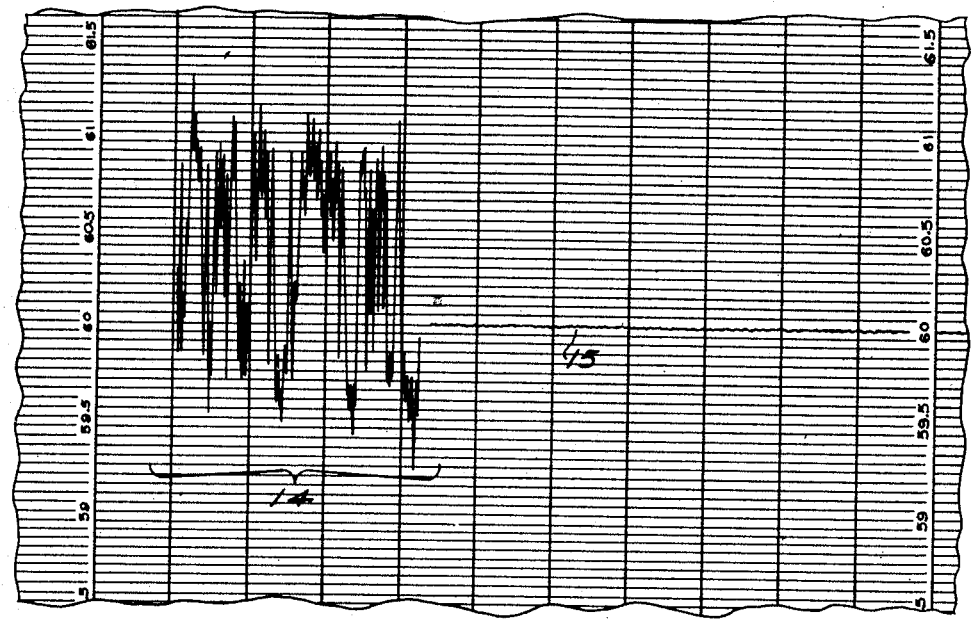
Fig. 2 is a reproduction of a fractional part of a record of the frequency of a motor generator set operated with and without the present invention applied thereto.

Heretofore one of the undesirable characteristics of motor generator sets has been the variations in frequency thereof. For example, referring to Fig. 2, it will be observed that the frequency of the generator 10 is exceedingly irregular as shown by the section 14 of the graph. In this section of the graph the frequency was constantly changing from around 59.3 cycles per second to 61.3 cycles per second, with the average deviation materially above the desired 60 cycles per second. In accordance with the invention, this same motor generator set maintained the frequency constant at 60 cycles per second as indicated by the substantially straight line graph 15. The deviation from the selected value is so small that it may not be read on the chart. From calculations made, the frequency was maintained within limits of plus or minus 0.007 cycles per second.

The foregoing results were obtained in accordance with one form of the invention by applying, through transformer 20, the alternating current voltage from the generator 10 through an inductance 21 to the opposite arms of a frequency-responsive bridge B. This bridge is of the type shown in said Wunsch patent. Reference may be had to that patent for a detailed analysis of the circuit and for the mathematical equations pertaining thereto.

The inductance 21 and the capacitor 22 are tuned to resonance at the desired frequency. They form a filter, which preferably has the characteristic of minimizing harmonics in the potential applied to the bridge B. The bridge itself consists of a resistor 23 in one arm, a resistor 24 in a second arm of the bridge and a slidewire 25 interconnecting the said two arms of the bridge. A third arm of the bridge includes a resistor 26 shunted by a capacitor 27, while a fourth arm of the bridge includes a resistor 28 and a series capacitor 29. A slidewire 30 interconnects the aforesaid third and fourth arms of the bridge. Although the resistors 25 and 30 are preferably slidewires, they, of course, may be replaced by adjustable resistors. The resistances of slidewires 25 and 30 are simultaneously changed, that is, the contacts 31 and 32 thereof, or the slidewires themselves, are mechanically coupled together so that resistance is added to or removed from the right-hand side of the bridge as viewed in Fig. 1, while resistance is simultaneously removed from or added to the left-hand sides of the bridge.

As fully explained in said Wunsch patent, the position of the slidewires 25 and 30, with respect to their cooperating movable contacts 31 and 32, produces a balance in the bridge B for a particular frequency. It will be assumed that with the parts in the position shown in Fig. 1, the bridge B will be balanced for a frequency of 60 cycles per second. Consequently, as long as there is applied to the bridge by conductors 35 and 36 an alternating current potential of exactly 60 cycles per second, the bridge will be balanced and no voltage will appear across the output conductors 38 and 39. However, if the frequency decreases or increases, there will be produced a voltage of magnitude proportional to the extent of the frequency change and of a phase related to the direction of unbalance, that is, the voltage is of one phase if the frequency increases and of the opposite phase when the frequency decreases. This output is applied to an amplifier 40 for producing an output which is proportional in magnitude to the unbalance voltage of the detecting bridge B and which output voltage reverses in phase according to whether the frequency is above or below the selected value, in this case, 60 cycles per second.

This output circuit, including conductors 41 and 42, directly supplies a winding 45 of a two-phase motor 46 by way of conductors 43 and 44. The other phase or winding 47 of motor 46 is connected across the output of the generator 10 through a phase-shifting capacitor 48 and a resistor 49. In consequence, the two-phase motor 46 will operate in a forward or reverse direction depending upon whether the frequency unbalance is in a positive or negative direction. The manner in which the selective rotation of the motor 46 is utilized to introduce a correction in the frequency of the generator 10 will later be described in detail.

Returning to the alternating current output of the amplifier 40, it will be observed that the amplifier output is capacitively coupled by capacitor 50 to the primary winding of a transformer 51, the opposite ends of the secondary winding of which are connected to the grids of a pair of electric valves 52 and 53. Though these valves have been shown as separate triodes, it is to be understood they may be included in a single envelope. Specifically, a tube similar to the 6SN7-GT may be used. These electric valves 52 and 53 produce a direct current which not only reverses with direction of unbalance but which is also proportional in magnitude to the extent of the unbalance. This is accomplished by applying through the secondary winding of a transformer 55 a voltage from the generator 10, which is connected by conductors 56 and 57, to the primary winding of transformer 55. The anode circuit for the valve 52 may be traced from one side of the secondary winding of transformer 55 by way of resistor 58 and a capacitor 59 in shunt therewith, from anode to cathode of valve 52, through a resistor 60 and a capacitor 61 in shunt therewith, a resistor 62, and by conductor 63 to the other side of the secondary winding of transformer 55. The valve 53 has like connections including the anode resistor 64, its shunting capacitor 65, and the resistor 66 and shunting capacitor 67 in the cathode circuit thereof. The resistor 62 is also included in the return circuit from the cathode of valve 53 to the other side of the secondary winding of transformer 55. It will be further observed the grid circuits are completed from a mid-tap on the secondary winding of transformer 51 through the resistor 62 to the respective cathodes.

When the frequency of the generator 10 is at its predetermined value, the bridge B is in balance and no output voltage is produced at the transformer 51. The grid or control electrodes of the tubes 52 and 53 then have applied to them a bias respectively produced by the cathode biasing means 60—62, and 62, 66—67. The anode or output circuits of the tubes 52 and 53 are energized at all times by the voltage of the generator 10. Accordingly, the tubes 52 and 53 will be conductive, and current will flow in the respective output circuits including the resistor-capacitor networks 58—59 and 64—65. In the absence of a frequency deviation, the circuits are so designed that the potentials across 58—59 and 64—65 are equal so that the potential existing between conductors 70 and 71 is zero.

It will now be assumed that the frequency of the generator 10 is higher than that desired. Accordingly, a voltage is produced at the transformer 51 having a phase relation, with respect to the voltage applied to the anode or output circuit by the transformer 55, such that the grid of tube 52 is made less negative (or more positive) with respect to the cathode, while the potential on the grid of the tube 53 is made more negative (less positive) with respect to its cathode. The result is an accentuated unbalance of the respective output circuits with the resultant production of a substantial voltage difference between conductors 70 and 71, the grid-circuit conductor 70 having a positive polarity with respect to the cathode-circuit conductor 71.

Should the frequency of the generator 10 be less than the desired frequency, the phase relation of the applied potential at the transformer 51 will be opposite to that just described. Consequently, the current flow through the tube 53 increases and the current flow through the tube 52 decreases to produce a resultant voltage between conductors 70 and 71 of opposite sign or polarity.

It will now be assumed that the frequency is increasing. So long as the frequency is increasing, the potential of the grid of tube 52 will be changing to a less negative (more positive) value with respect to its cathode and the potential of the grid of tube 53 will be changing to a more negative (less positive) value with respect to its cathode. Accordingly, the anode current of tube 52 will be increasing while that of the tube 53 will be decreasing. The rates of change of the output currents are related to the rate of change of the frequency. In accordance with the invention, the grid-biasing network 60—61 does not immediately increase the negative bias on the tube 52 with a rising output current. If the output current rises rapidly due to a rapid frequency change, the impedance of the capacitor 61 will be low and the increased negative bias will not appear until after the capacitor 61 has been charged to a new value.

Accordingly, if it be assumed that the frequency rapidly rises and that no corrective action takes place, it will be understood that during such rapid rise the potential of conductor 70 with respect to conductor 71 will be much higher during the rise than it will be after the frequency ceases to rise and capacitor 61 is fully charged.

When the frequency is decreasing, the potential on the grid of tube 53 will be decreasing to a less negative (more positive) value while the potential on the grid of tube 52, with respect to its cathode, will be increasing in the negative direction. Therefore, the potential of the conductor 70 with respect to the conductor 71 will likewise be decreasing. Summarizing, the potential difference between the conductors 70 and 71 is dependent upon both the rate of change of the frequency and upon its direction and extent of deviation from the predetermined value. Thus, that potential difference varies as a differential function of the frequency.

The output currents of tubes 52 and 53 are utilized to regulate or to bring back to normal value the frequency of the generator 10. Though relays or other circuit-controlling elements may be utilized, in the preferred form of the invention, the direct-current voltage produced between the conductors 70 and 71 is applied to control the operation of a pair of grid-controlled rectifiers 72 and 73, preferably of the thyratron type. The anode circuits of these tubes are energized from a suitable source of alternating current as indicated by the terminals 74 which are connected to the primary winding of transformer 75, the opposite ends of the secondary winding of which are connected to the anodes with a center tap connected by conductor 76 to the field winding 12 of motor 11, and thence by conductor 77 to the respective cathodes of Thyratron tubes 72 and 73.

It will be observed the conductor 70 leads to the mid-tap of the secondary winding of transformer 78, the opposite ends of said secondary winding being connected to the respective grids of said Thyratron tubes. The primary winding of transformer 78 is energized from a suitable source of alternating current 74 by means of a transformer 79 which is connected to the primary winding 78 by a phase-controlling network N. This network N consists of a capacitor 80 and a resistor 81 connected in adjacent arms of a bridge circuit, with resistors 82 and 83 connected in the other adjacent arms of the bridge. The resistor 82 is provided with a contact 84 which may be moved relative to the resistor 82 by means of the motor 46. As the value of resistor 82 is varied, the phase of the voltage applied to the grids of Thyratrons 72 and 73 is changed relative to the phase of the voltage applied to the anode circuits thereof. The phase-shifting control network is effective to shift the phase from an in-phase to a substantially 180° out-of-phase relation with respect to the anode supply voltage.

The illustrated system has the advantage that the resistance of resistor 82 may be initially so selected that the respective Thyratron tubes 72 and 73 supply a relatively small current to winding 12 for rotation of the motor 11 at a speed for the generation of the desired frequency by the generator 10.

If the "Load" increases, the frequency of the generator 10 will decrease. This decrease will be immediately detected by the frequency-responsive bridge and the amplifier will produce an amplified output for the energization of the motor winding 45 for rotation thereof in a direction to increase the direct current output of the Thyratron tubes 72 and 73 and thus to increase the excitation of the motor field winding 12. By increasing its excitation, the resultant motor excitation will decrease and the motor 11 will increase its speed of rotation and will thus bring the frequency of generator 10 back to its normal or selected value. It will be seen at once that if the frequency deviation does not immediately disappear, the motor 46 will continue to be energized with further adjustment of the value of the resistor 82. The motor 46 may be considered an adjusting means which produces an adjustment of a semi-permanent character as an integral function of the deviation in frequency from the desired value.

The initial corrective action results from the application of the same unbalance-voltage to the valves 52 and 53, as that applied to the motor winding 45. As before, it will be assumed that a decrease in frequency causes the valve 52 to become more conductive, with the production of a substantial bias voltage across the resistor 58 and capacitor 59. The result is the immediate application of a substantially lower negative bias to the grids of the Thyratron tubes 72 and 73. With a lower negative bias applied thereto these Thyratron tubes 72 and 73 are conductive for a larger fraction of the total period of each cycle and, hence, the average excitation of the field winding 12 is increased. Because of this primary corrective action, the speed of the motor 11 is changed immediately upon the detection of any frequency change of the generator 10. Nevertheless, the motor 46 rotates a slight amount (depending upon the extent of the deviation) to make an adjustment between contact 84 and resistor 82. This adjustment takes care of the more or less permanent condition which may exist in the "Load" and which condition gave rise to the increased load which caused the decrease in the frequency. The result of both corrective actions is that the frequency deviation of the generator 10 is minimized and made so small as to be relatively negligible, the primary action being due to the immediate and rapid control of the Thyratron tubes 72 and 73, and the corrective action of the motor 46 being such as to introduce a correction which compensates for the condition which gave rise to the original change in frequency. The system is not only rapid in action but is stable because of the concurrence of both corrective actions.

Figure 3:
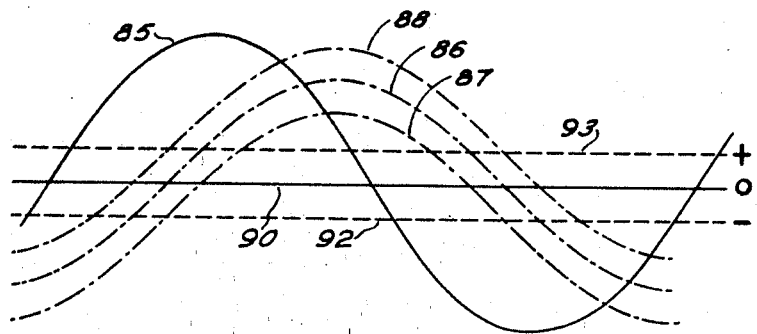
Fig. 3 is a graph showing the phase relations between the grid and anode voltages of a pair of Thyratron control tubes with different bias potentials on the grid or input circuits thereof.

Referring to Fig. 3, there has been plotted the anode voltage 85 as ordinates against time as abscissae, together with corresponding grid voltages 86, 87 and 88 with respect to the cathode. It will be assumed that for normal conditions of operation the grid or input circuits of the control tubes 72 and 73 have a normal A. C. bias applied to them as indicated by the curve 86 which is substantially out of phase with the anode voltage curve 85. The effect of adding a negative D. C. grid bias is to lower the base line from the line 90 to the broken line 92. This has the effect, as shown by the curve 87, of increasing the difference in phase between the anode and grid voltages. In other words, the control tubes 72 and 73 will be conductive for a less part of each half cycle than they were with the bias as illustrated by the line 90.

Conversely, if the D. C. grid bias is increased in a positive direction as indicated by the horizontal broken line 93, the grid voltage, as shown by the curve 88, has the effect of movement more into phase with the anode voltage and the control tubes 72 and 73 conduct current for greater fractions of each half cycle. Thus by effectively shifting the phase by adding a D. C. bias as indicated, a substantial and primary corrective action is rapidly and effectively secured.

Figure 4:
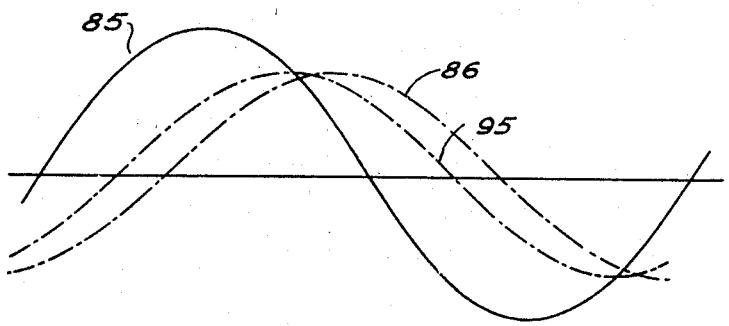
Fig. 4 is a graph illustrating the change in the phase relations between the grid and anode voltages of said control tubes due to adjustment of a control network.

Referring to Fig. 4, the anode voltage has again been illustrated by the curve 85. The normal phase relation of the grid voltage 86 has again been illustrated. However, when there is a frequency deviation below the normal value, the motor 46 is energized to bring the grid voltage more into phase with the anode voltage. Such an adjustment of resistor 82 moves the grid voltage from that indicated at 86 to that as indicated by the curve 95. Hence, it will be observed that the control tubes 72 and 73 will be conductive for greater fractions of each half cycle, thereby to increase the excitation of winding 12. Conversely, a change in frequency above normal will shift the phase of the grid voltage so as to increase the field excitation of the motor 11.

Now that the principles of the invention have been explained, it will be understood that many applications may be made of the output of the Thyratron tubes 72 and 73. For example, instead of controlling the excitation of the field winding 12 of the motor 11, the motor 11 with its field winding 12 may be replaced by the prime mover such, for example, as a steam turbine 96, Fig. 5, provided with a valve 97, operable by a solenoid 98, and a spring 99 to adjust the speed of the turbine 96. The solenoid 98 is energized from the output circuit including conductors 76 and 77 of the Thyratron tubes 72 and 73 (Fig. 1). As the frequency of the generator 10 decreases, the excitation of the solenoid 98 increases and operates the lever 100, pivoted at 101, in the direction to open the valve 97 and to increase the speed of the turbine 96. As soon as the frequency is returned to its selected value the valve 97 is retained in its new position.

In accordance with a further modification of the invention, Fig. 6, a solenoid 102 may be energized from the same output conductors 76 and 77, and arranged to apply a loading to a lever arm 103, pivoted at 104, of a governor-controlled valve 105. This valve may be utilized to control the speed of a hydraulic turbine (not shown). These two modifications are intended to be suggestive of many uses to which the invention may be put.

Further in accordance with the invention, and with particular reference to Fig. 7, if it should be desired accurately to control the voltage of the alternating current generator 10, driven by a prime mover P. M., this may be readily accomplished by substituting for the frequency bridge B of Fig. 1 a voltage-responsive bridge V. The bridge V consists of an electric lamp 110 in one arm of the bridge, a resistor 111 in a second arm of the bridge, a second electric lamp 112 in a third arm of the bridge and a second resistor 113 in the fourth arm of the bridge. The voltage from the generator 10 is applied to the bridge by way of the transformer 20 at the conjugate points 114 and 115. The resistors 111 and 113 are adjusted so that at a desired or predetermined voltage of the generator 10, no voltage appears between the conjugate points 116 and 117. Preferably the lamps 110 and 112 are of the tungsten filament type. Such lamps exhibit a positive temperature coefficient of resistance.

If now the voltage of the generator 10 should rise above its predetermined value, the potential of the point 117 approaches that of the point 115 while the potential of the point 116 approaches the potential of the point 114. Conversely, when the voltage of the generator 10 decreases below the predetermined value, the potential of the point 117 approaches that of the point 114 while the potential of the point 116 approaches that of the point 115. The degree to which the potential of points 117 and 116 approaches that of points 114 and 115 depends upon the extent of departure of the voltage of the generator 10 from the predetermined value, while the relative polarities of the points 117 and 116 reverse as the potential of the generator 10 passes through the desired or predetermined value.

Accordingly, there is applied by conductors 38 and 39 to the amplifier, the grid rectifier and thyratron systems, diagrammatically indicated in Fig. 7, a voltage whose polarity or phase reverses with the sense of departure of the voltage of generator 10 from its predetermined value and whose magnitude is dependent upon the extent of the departure. The thyratron system is adjusted so that the output current through the conductors 76 and 77 supplies excitation for the field winding 10a of the generator 10 for the production of the desired voltage. When the voltage rises the excitation or exciting current flowing through the output circuit 76—77 decreases to reduce the voltage. Conversely, when the voltage of the generator 10 decreases, the excitation current increases.

As in the case of Fig. 1, the capacitors 61 and 67 function to produce a substantial initial change in the excitation current. Simultaneously the motor 46 is energized to effect through the phase-shifting network N a semi-permanent readjustment of the excitation current and generator voltage. In this manner, the system functions accurately to maintain the voltage of the generator 10 at its selected and predetermined value.

For application of the invention to a direct current generator 120, Fig. 8, the system may be simplified. As shown, the voltage of the generator 120 is applied by conductors 121 and 122 to a voltage-responsive bridge V' which basically consists of the same elements as the bridge V of Fig. 7. However, there has been added a capacitor 123 in parallel with the resistor 113 and a capacitor 124 in parallel with the resistor 111. As will be later explained, these capacitors 123 and 124 perform, in the system of Fig. 8, the same functions as the capacitors 61 and 67 in the system of Fig. 1.

Normally, the output of the grid rectifiers 72 and 73, of the thyratron type, is applied by conductors 76 and 77 to the field winding 125 of the generator 120 and is of a magnitude for the production of the selected and predetermined voltage. This adjustment may be readily effected by varying the resistance of the resistor 82 as by contact 126 in the network N.

If now the voltage of the generator 120 rises above its predetermined value, the potential of the point 116 will approach that of the point 114 which, it will be observed, is connected to the negative side of the generator 120. At the same time, the potential of the point 117 approaches that of the point 114 which, it will be observed, is connected to the positive side of the generator 120. Accordingly, a negative bias is applied to the grids, with respect to their cathodes, of the tubes 72 and 73 to produce a phase shift which decreases the period in each cycle during which these tubes are conductive. This decreases the excitation current of the field winding 125 and reduces the voltage of generator 120.

Conversely, if the voltage of generator 120 is lower than the predetermined value, the point 117 becomes negative and the point 116 becomes positive to apply a positive bias on the grids, with respect to their cathodes, of tubes 72 and 73 to increase the excitation current and to increase the voltage of the generator 120.

During an increase of voltage, the potential of point 117 is nearer that of point 115 and the potential of the point 116 is nearer the point 114 than each would be if conditions were steady. This follows because the capacitors 123 and 124 during the increase of voltage effectively reduce the impedance between the points 117 and 115 on the one hand and between the points 114 and 116 on the other hand. Accordingly, for an increasing voltage there is applied to the grids of the Thyratrons 72 and 73 a potential which is more negative than would be the case for steady state conditions, with the result that the current in the field winding 125 is initially lower and, therefore, provides a rapid initial correction to compensate for the rising voltage. Conversely, upon a decreasing voltage the potential of point 117 is nearer that of point 114 and the potential of point 116 is nearer that of point 115 than either would be for steady state conditions. Accordingly, the excitation of the field winding 125 is initially increased more rapidly, quickly to restore the voltage at its initial value.

It will be further observed that across output conductors 130 and 131 there is connected the armature of a separately excited motor 132. This motor, shown as having a permanent magnet for its field excitation, has the armature mechanically connected to adjust the contact 84 of the resistor 82. The motor 132 functions similarly to the motor 46 of Fig. 1, and provides an increase in the excitation of field winding 125 for a decreasing voltage and decrease in the excitation for an increasing voltage. Thus, all of the corrective actions of Fig. 1 have been retained in the simplified system of Fig. 8 and they cooperate to maintain constant at a predetermined value the voltage of the generator 120.

While preferred modifications of the invention have been disclosed, it is to be understood that additional modifications may be made, and it is therefore intended by the appended claims to cover all modifications within the spirit and scope of the invention.

What is claimed is:

1. In a control system for a dynamo-electric machine, the combination of means for controlling the magnitude of an operating characteristic of said machine comprising means including a network for obtaining a direct current potential having a polarity and a magnitude determined by the sense and extent of said deviation of said characteristic from a predetermined value, a control means for varying the magnitude of said characteristic, means responsive to said deviation in said characteristic for producing a corrective setting of said control means, and means responsive to the setting of said control means and to said direct current potential for bringing said characteristic back to its said predetermined value.

2. In a control system for a dynamo-electric machine, the combination of means for controlling the magnitude of an operating characteristic of said machine comprising means including a control network for obtaining an alternating current having a phase and magnitude determined by the sense and extent of deviation of said condition from a predetermined value, means responsive to said alternating current for producing a corrective setting of said controlling means, means cooperating with said network for obtaining a direct current potential having a polarity and a magnitude determined by the sense and extent of deviation of said condition from said predetermined value, and means responsive to the setting of said controlling means and to said direct current potential for bringing the magnitude of said condition back to said predetermined value.

3. In a control system, the combination of a network responsive to deviation in the magnitude of a condition, means including an amplifier responsive to unbalance of said network for producing an alternating current potential having a phase relation and a magnitude determined respectively by the sense and extent of deviation of said condition from a predetermined value, means responsive to said alternating current potential for producing a direct current potential having a polarity and magnitude determined by the sense and extent of deviation of said condition from said predetermined value, and control means operable under the joint control of said alternating and direct current potentials for maintaining said condition at its said predetermined value.

4. The combination as set forth in claim 3 in which said control means includes electric valves having input grid circuits subjected to the bias of said direct current potential, phase-shifting means included in said input circuits, and means responsive to said alternating current potential for adjusting said phase-shifting means.

5. In a control system, the combination of a network responsive to deviations in the magnitude of a condition, amplifier means responsive to unbalance of said network for producing an amplified alternating current having a phase relation and magnitude determined by the sense and extent of deviation of said condition from a predetermined value, means for rectifying said amplified alternating current, means for controlling the magnitude of said condition, and means responsive to said amplified alternating current potential and to a rectified component thereof for adjusting said controlling means to correct for said deviation in the magnitude of said condition.

6. In a frequency-control system, the combination of a network responsive to deviation of the frequency from a predetermined value, means responsive to said network for producing an alternating current potential having a phase relation and magnitude determined by the sense and extent of deviation of said frequency from said predetermined value, a pair of electric valves having input and output circuits, means for applying said alternating current potential to said input circuits, means for energizing said output circuits from said alternating current source, means including said output circuits for deriving from said valves a direct current potential having a polarity and a magnitude determined by the sense and extent of deviation of said frequency from said predetermined value, electric valve means having an input and output circuit, the conductivity of which valve means may be controlled by varying the bias of the input circuit and the phase relation between voltages applied to the input and output circuits thereof, means for applying said direct current potential to said input circuits to vary the bias thereof, means for applying alternating current potentials to said input and output circuits of said electric valve means, means for adjusting the phase between said input and output potentials, and means responsive to the output from said valve means for maintaining said frequency substantially constant at said predetermined value.

7. In a control system, the combination of a network responsive to deviation in the magnitude of a condition, means responsive to unbalance of said network for producing an amplified alternating current potential having a phase relation and magnitude determined by the sense and extent of deviation of said condition from a predetermined value, a pair of electric valves having input and output circuits, means for applying said alternating current potential to said input circuits, means for energizing said output circuits from said alternating current source, means including said output circuits for deriving from said valves a direct current potential having a polarity and a magnitude determined by the sense and extent of deviation of said condition from said predetermined value, electric valve means having an input circuit and an output circuit, the conductivity of which valve means may be controlled by varying the bias of the input circuit and the phase relation between potentials applied to the input and output circuits thereof, means for applying said direct current potential to said input circuit to vary the bias thereof, means for applying to said input and output circuits alternating current potentials, means responsive to said first-named amplified alternating current potential for adjusting the phase between said input and output potentials, and means responsive to the output from said valve means for maintaining the magnitude of said condition substantially constant at said predetermined value.

8. The combination with a pair of electric valves having input and output circuits, means for applying alternating current potentials to said input and output circuits, and means for varying the phase relation between said potentials, of means including a network for applying a direct current biasing potential to said input circuits having a polarity and magnitude determined by the sense and extent of deviation of a condition from a predetermined value, means responsive to the rate of change in the magnitude of said condition for further varying said biasing potential, means responsive to the extent and duration of said deviation of said condition from said predetermined value for adjusting said phase-shifting means, and means responsive to the output of said electric valves for maintaining the magnitude of said condition at said predetermined value.

9. The combination with a pair of electric valves having input and output circuits, means for applying alternating current potentials to said input and output circuits and means for varying the phase relation between said potentials, of means including a network for applying a direct current biasing potential to said input circuits having a polarity and magnitude determined by the sense and extent of deviation of a condition from a predetermined value, means responsive to a differential function of the change in the magnitude of said condition for varying said biasing potential, means responsive to an integral function of said deviation for adjusting said phase-shifting means, and means responsive to the output of said electric valves for maintaining the magnitude of said condition at said predetermined value.

10. In a control system, the combination of means including a network for producing a direct current potential having a polarity and a magnitude determined by the sense and extent of deviation of said condition from a predetermined value, a pair of electric valves having input and output circuits, means for applying alternating current to said input and output circuits, means for applying said direct current potential to said input circuits to vary the bias thereof, means including said output circuits for deriving from said valves a direct current having a magnitude determined by the sense and extent of deviation of said condition from said predetermined value, means responsive to deviation in the magnitude of said condition from a predetermined value for varying the phase relation between said alternating current potentials applied to said input and output circuits, means responsive to the rate of change of said condition for varying said direct current bias applied to said input circuits, and means responsive to the output from said valves for maintaining the magnitude of said condition substantially constant at said predetermined value.

WILLIAM E. PHILLIPS.

REFERENCES CITED

The following references are of record in the file of this patent:

UNITED STATES PATENTS

| Number | Name | Date |
|---|---|---|
| 2,104,801 | Hansell | Jan. 11, 1938 |
| 1,788,734 | Morton | Jan. 13, 1931 |